United States Patent [19]
Melenric

[11] Patent Number: 5,189,875
[45] Date of Patent: Mar. 2, 1993

[54] SELF STARTING VALVED PULSE JET

[76] Inventor: John A. Melenric, 8417 Cedarbrake, Houston, Tex. 77055-4825

[21] Appl. No.: 580,184

[22] Filed: Sep. 10, 1990

[51] Int. Cl.$^5$ ............................................. F02K 7/067
[52] U.S. Cl. ..................................... 60/249; 60/39.76
[58] Field of Search .............. 60/247, 248, 249, 39.76, 60/39.77, 39.78, 39.79, 39.8

[56] References Cited

U.S. PATENT DOCUMENTS

| | | | |
|---|---|---|---|
| 3,188,804 | 6/1965 | Melenric | 60/249 |
| 3,354,650 | 11/1967 | Malroux | 60/249 |
| 3,517,510 | 6/1970 | Melenric | 60/249 |
| 3,823,554 | 7/1974 | Melenric | 60/249 |

Primary Examiner—Louis J. Casaregola

[57] ABSTRACT

A self starting valved pulse jet particularly adapted to power pilotless aircraft in the subsonic speed range. This invention is somewhat related to my U.S. Pat. No. 3,823,554. The device continues to utilize a substantially cylindrical combustion chamber, a reduction cone and exhaust tube. The multiplicity of reverse flow air and fuel inlet tubes projecting through the reduction cone into the combustion chamber have been modified so each air and fuel inlet utilizes two tubes axially aligned with each other. The aft tube diameter is less than the forward tube. An opening between the tubes permits gas to flow to and from an annular plenum chamber surrounding the air inlet tubes. The plenum chamber also houses an equal number of shrouded valve assemblies in its outer wall. The small aft tube of the air and fuel inlet secures and penetrates through the aft annular wall of the plenum chamber. The aft end of the small diameter tube contains a one-way flow valve permitting air to flow through it only during engine start. After engine start all air flows through the one way flow valve assemblies housed horizontally in the outer wall of the aforementioned annular plenum chamber and into the large diameter forward tube and into the combustion chamber similar to my aforementioned patent. High pressure fuel is injected through the air and fuel inlets into the combustion chamber. Starting ignition in the combustion chamber insures a quick engine start with movement of one throttle lever.

11 Claims, 2 Drawing Sheets

SELF STARTING VALVED PULSE JET

CROSS REFERENCE TO RELATED APPLICATION

The device of this invention is somewhat related to applicant's U.S. Pat. Nos. 3,517,510 and 3,823,554. Some of the construction features of the device of this invention are similar to the above mentioned patents which are valveless pulse jets and are very easy to start and stop on the ground or in the air; whereas, all valve type pulse jets are considered difficult to start, auxiliary compressed air must be supplied and usually many attempts are necessary before a successful engine start is completed. This invention might be considered a hybrid between the easy starting valveless pulse jet and the higher efficiency valved pulsed jet, the advantages of both engines being incorporated into one superior operating engine. The device of this invention is particularly designed with a view of retaining low specific fuel consumption and optimum thrust, by utilizing shrouded side-facing valve assemblies mounted in a plenum chamber located aft of the combustion chamber and directing air-flow from these valves through reverse flow fuel and air inlets into the combustion chamber.

BACKGROUND OF THE INVENTION

This invention pertains to valved pulse jet engines designed for high speed operation. Existing valved pulse jets generally lose thrust and increase specific fuel consumption with increasing airspeeds. The engines are difficult to start, requiring auxilliary compressed air to be blown externally through one-way flow air valves located in the front of the combustion chamber. The device of this invention is particularly designed with a view to retaining low specific fuel consumption and optimum thrust at high airspeeds by utilizing reverse flow fuel and air inlets leading from shrouded side-facing valve assemblies. The device of this invention incorporates unique valved starting tubes and fuel nozzle assemblies that permits engine air or ground starts simply by moving the one throttle lever forward.

SUMMARY OF THE INVENTION

The device of this invention basically incorporates the combustion chamber, reduction cone, exhaust cone and exhaust tube diffuser of my U.S. Pat. No. 3,823,554. The reverse flow air and fuel inlets, which secures and penetrates the reduction cone of the combustion chamber have been modified so each inlet utilizes two tubes axially aligned with each other; the aft tube having a smaller diameter. An opening between the tubes permits gas to flow to and from an annular plenum chamber surrounding the air and fuel inlets and housing an equal number of shrouded valve assemblies. The small aft tube of the air and fuel inlet secures and penetrates through the aft annular wall of the plenum chamber. The aft end of the small diameter tube contains a one-way flow valve permitting air to flow through it only during engine start. After engine start all air flows through the one-way flow valve assemblies housed horizontally in the outer wall of the aforementioned annular plenum chamber and into the large diameter forward tube and into the combustion chamber similar to my aforementioned patent. High pressure fuel is injected through the air and fuel inlets into the combustion chamber. Starting ignition in the combustion chamber insures a quick engine start with movement of one throttle lever. Specifically designed ducted shrouds mounted on top the valve assemblies permit high speed engine operation without valve diaphragm lag.

DESCRIPTION OF THE PREFERRED EMBODIMENT

Figures 1, 2:
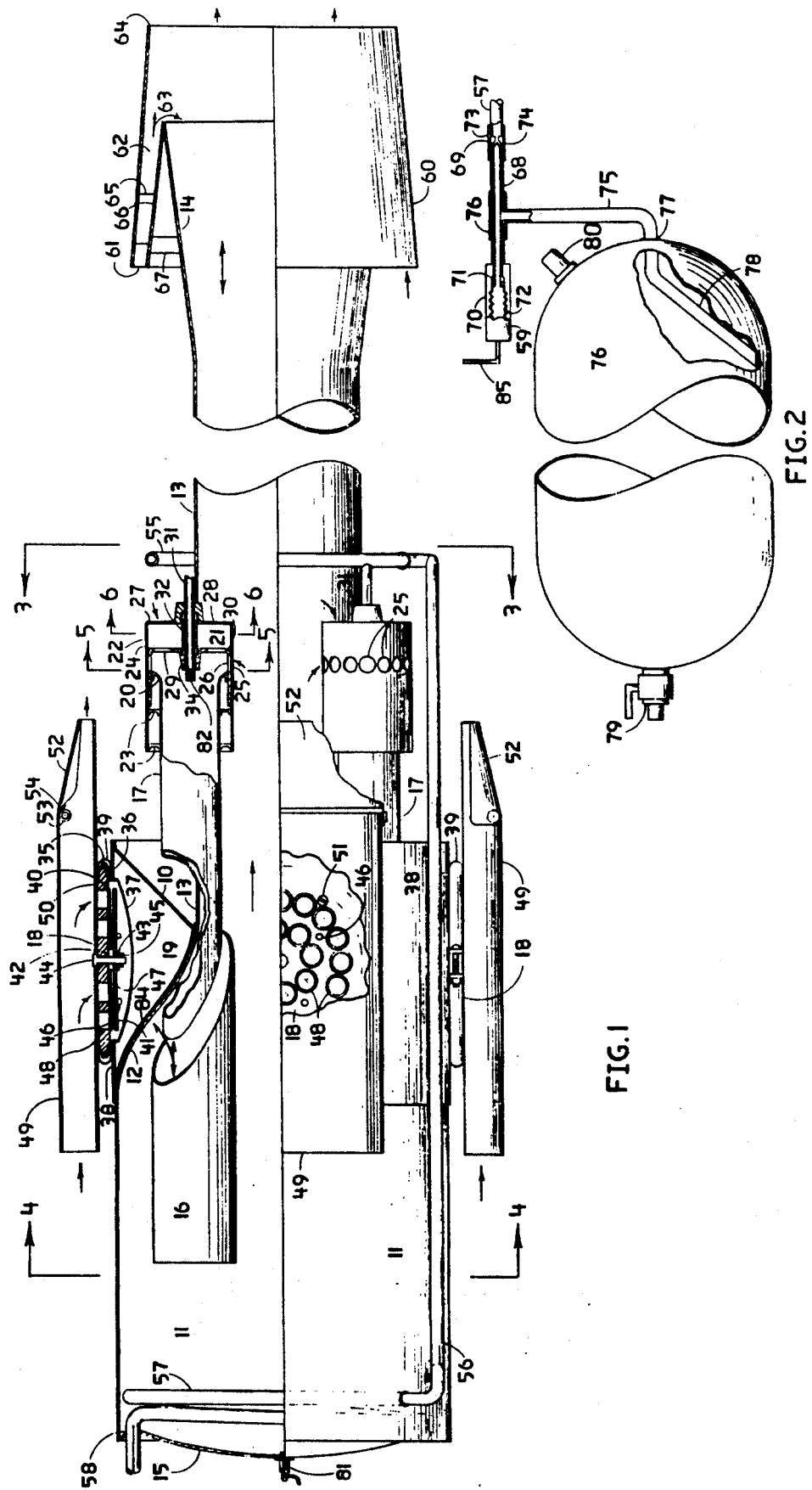
FIG. 1 is a side elevation partially in cross section of the engine. When facing forward, the left top air fuel inlet is kept in place with a fragmented cross sectional view of the aft end. The middle of the small inlet tube is also cut away to expose the cross section of the engine plenum chamber. The outer shroud cover spring loaded door of the left valve assembly is cut away to show the one-way valve housing of the aft end of the lower left air and fuel inlet. The outer shroud cover is cut away to show the joint of one valve assembly plate and floor of the ducted shroud.
FIG. 2 is a side elevation view of the fuel tank, fuel lines, and throttle valve which is partially shown in cross section. A cut away in the fuel tank drawing shows the fuel tank probe.
Figure 4:
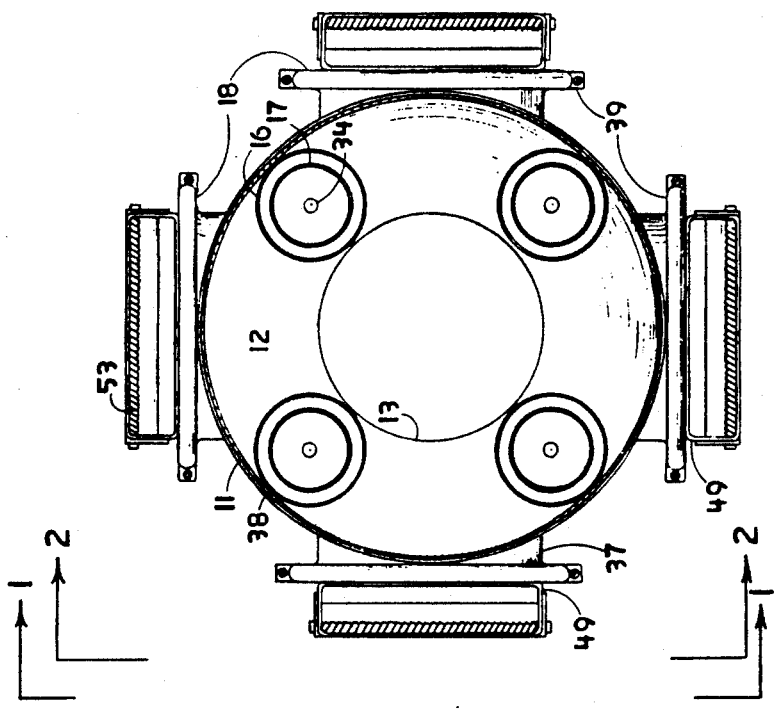
FIG. 4 is a fragmentary sectional view taken substantially on line 4—4 of FIG. 1 looking in the direction of the arrows.

For a description of the preferred embodiment, its method of construction and operation, reference is made to the attached views and the following detailed description wherein identical reference characters refer to identical or equivalent components throughout the several views and the following detailed description.

The device of this invention may be constructed from various metals or alloys; however, the preferred embodiment was constructed from 321 or 347 type stainless steel AMS spec. 5510, 5512 or 5570. Any number of acceptable methods could be employed for the securing of the components in a unitary structure; however, the preferred embodiment, heliarc welding and vacuum furnace brazing was primarily used in the construction. For a general description of the construction of the main components of the device of the invention one might well refer to my previous U.S. Pat. Nos. 3,517,510 and 3,823,554.

Figure 7:
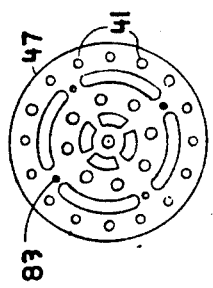
FIG. 7 is a plan view of the diaphragm back plate.
Figure 6:
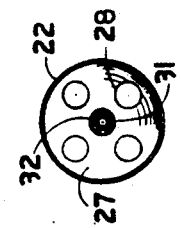
FIG. 6 is a fragmentary sectional view taken substantially on line 6—6 of FIG. 1 looking in the direction of the arrows.
Figure 5:
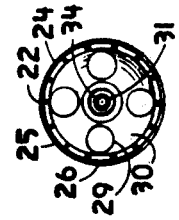
FIG. 5 is a fragmentary sectional view taken substantially on line 5—5 of FIG. 1 looking in the direction of the arrows.
Figure 3:
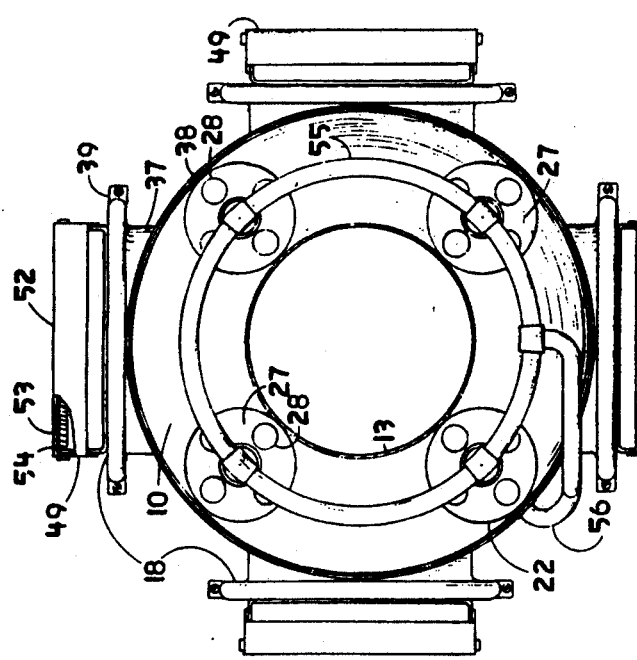
FIG. 3 is a fragmentary sectional view taken substantially on line 3—3 of FIG. 1 looking in the direction of the arrows.

Referring to FIG. 1, the device is constructed around a substantially cylindrical combustion chamber 11. Aft of the combustion chamber 11 is constructed or secured, the combustion chamber reduction cone 12 to which is attached the elongated exhaust tube 13 which terminates in its aft end in the exhaust tube nozzle 14. Secured to the forward end of the combustion chamber 11 is the combustion chamber forward wall 15 constructed at substantially right angles to the exhaust tube 13. A multiplicity of reverse flow air fuel inlet tubes 16, 17 and valve assemblies 18 equiangularly spaced around and aft combustion chamber 11 and housed in annular plenum chamber 19. Each air and fuel inlet utilizing two tubes 16, 17 axially aligned with each other. The aft tube 17 cross sectional area one-half the cross sectional area of the forward tube 16. The forward fuel air inlet tube 16 projecting into the cylindrical combustion chamber 11 with the aft end welded or otherwise secured to the reduction cone 12 providing an aerodynamically smooth surface at the joint of the two component members. The aft tube 17 penetrates and secures to the conical structure 10 making up the aft end of the plenum chamber 19. The air and fuel reverse flow inlet tubes 16 and 17 being constructed on an axis parallel to the axis of combustion chamber 11 and exhaust tube 13. An opening between the forward and aft air fuel inlet tubes 16 and 17 that is equal to twice the cross sectional area of the forward tube 16, permitting gas to flow between the tubes and the annular plenum chamber 19 housing the equal number of shrouded 49 valve assemblies 18. Each circular valve body 50 of valve assembly 18 is double beveled around the edges 35. The inner bevel, relative to the center line of the engine, matches the flange 36 of a short length thin walled cylindrical member 37 which secures to the outer cylindrical wall 38 of annular plenum chamber 19. A screw adjusted circular clamp 39 removably secures the valve assembly 18 to the flange of cylindrical member 37. Each valve assembly includes a valve body 50, a soft disk shaped diaphragm 40 shown seating to valve body 50, a diaphragm back plate 47, spacer washers 42, lock washer 43, screw 44, nut 45 and diaphragm guide pins 46. FIG. 7 shows the pattern of the diaphragm back plate 47. The diaphragm back plate contains a small blow hole 41 for each valve hole 48 in the valve body 50. The diaphragm 40 uses the exact pattern of the diaphragm back plate 47, except the diaphragm has no blow holes 41 and its center hole is enlarged to fit loosely around the space washers 42. The diaphragm is made from heat resistant silica fabric. The back plate 47 and the diaphragm 40 has a desired number of holes 83 that fit loosely around valve body guide pins 46. The top of each valve assembly 18 is shrouded by an essentially rectangular cross section duct 49. The duct is removably secured to the valve body 50 by screw fasteners 51. The aft end of duct 49 includes a spring-loaded door 52 which is normally closed, restricting the cross sectional area at the aft end. The force of torsional spiral spring 53 coiled around hinge shaft 54 maintaining constant tension on door 52. The rear end of the aft fuel air inlet tube 17 is attached to bellmouth 20 and in prolongation of bellmouth 20 is constructed a spring loaded one way air valve 21 which is normally open. It contains a valve housing 22 secured to fuel air inlet tube 17 by annular vertical plates 23. A spring loaded valve piston 24 guided to move fore and aft without rotation thus keeping the multiplicity of air inlet openings 25 and 26 of the valve housing 22 and valve piston 24 respectively in proper alignment with each other in the full forward valve position as shown in cut-away FIG. 1. The circular air openings 25, 26, 28 and 29 may be rectangular or oval to get the desired air flow. The aft end of valve housing 22 secures to vertical plate 27. Shown in FIG. 6, vertical plate 27 contains multiple air flow openings 28 forty-five degrees off-set the air flow openings 29 in vertical plate 30 of piston 24 shown in FIG. 5. Fuel line 31 secures to vertical plate 27 of valve housing 22 at the center line of air inlet 17. The fuel line serves as a guide for spring 32 and a shaft for piston 24 to slide to the desired fore and aft positions. Valve piston 24 is mutually stabilized, sliding between its outer wall and housing wall 22 and its vertical wall bearing 34 and fuel line 31. There are a number of suitable one way air valves that could provide the same function as the described valve, therefore the invention is not limited to this specifically described valve. The fuel line 31 has a restricting orifice at its exhaust end 82 described in some detail in my U.S. Pat. No. 3,823,554. The exhaust tube nozzle 14 is generally the same as described in my U.S. Pat. No. 3,823,554. It contains an exhaust tube diffuser 60 secured to the exhaust tube nozzle 14. The exhaust tube diffuser 60 is a truncated conical structure, the base projecting forward around the exhaust tube nozzle 14. The largest diameter in the forward edge comprises diffuser inlet 61. The inner wall of diffuser inlet 61 is also a truncated conical structure 66, its aft edge securing to the aft end of exhaust tube nozzle 14. The channel between the conical structures 60 and 66 comprises a diffuser flow channel 62. The area of reverse flow into the nozzle 14 is designated as the diffuser intake 63. The diffuser 60 terminates at its aft end in the diffuser exhaust cone 64. The device is made integral and stable with the exhaust tube nozzle 14 by means of diffuser radial supports 65 and 67.

Fuel line 31 extending aft from air valve 21 secures to a vertically mounted and circular fuel manifold 55 of larger cross sectional area. Fuel line 56 secures to the bottom of fuel manifold 55 equally spaced between the described fuel lines 31. Fuel line 56 extends forward along the side of the combustion chamber 11 to the front end and slightly aft combustion chamber front plate 15. After an approximately 90 degree bend the fuel line 56 penetrates the combustion chamber 11 approximately normal to its outer wall and making a spiral inside the combustion chamber of one and one-half turns forming heat exchanger 57. With a 90 degree bend forward it penetrates combustion chamber plate 15 at the top of the engine, point 58. Fuel needle valve 59 shown in FIG. 2 secures to heat exchanger fuel line 57 as close as possible to combustion chamber front plate 15. Fuel valve 59 contains a long valve stem 68 and lever 85, threaded toward the fwd end, and a needle tip 69 at the aft end and housed in bonnet 70. An O-ring 71 prevents fuel leakage between the threads 72 of the bonnet 70 and valve stem 68. Cylindrical doubler 73 secures the heat exchanger tube 57, the valve bonnet 70 and needle valve seat 74 in place. Approximately half way between the O-ring 71 and the needle tip 69 of the valve stem 68, a fuel line 75 ties into the bonnet 70 approximately normal to the longitudinal axis of the valve. A cylindrical doubler 76 provides additional strength to the joint. Fuel line 75 secures to a high pressure fuel tank at point 77. Inside the fuel tank fuel line 75 secures to a fuel line stem 78 that extends to the lowest point in the fuel tank 76. The fuel tank 76 is provided with a standard fuel filling valve 79 and combination vent and pressure relief valve 80. The vent and pressure relief valve 80 is always located at the highest section of the tank. A spark plug 81 is secured to the forward edge of the combustion chamber front plate 15 shown at the center line of the engine. The spark plug 81 is connected to a capacitive discharge ignition system providing a continuous high frequency spark when turned on. The ignition switch may be coupled with throttle lever 85; ignition is energized from approximately 5 percent to 60 percent of the total throttle lever travel. Heat insulation material 84 covers cone 12.

OPERATION OF THE DEVICE

To operate the engine, fuel is loaded into the high pressure fuel tank 76. Liquefied gaseous fuels such as propane, butane, or hydrogen are the preferred fuels. Tank strength and pressure relief valve settings being compatible with the desired fuel. With the ignition system coupled to the throttle lever 85, the engine is operated with only one lever. The throttle lever is turned approximately 10 percent of total travel. Pure liquid from the fuel tank 76 flows through fuel stem 78 and fuel line 75 into throttle valve 70, through needle valve seat 74. As the fuel flows through the valve seat 74, the liquid expands into a gas because the pressure on the forward side of the valve seat 74 is essentially ambient. The rapid pressure drop causes a corresponding temperature drop. Evidence of the temperature drop is seen by a frost build-up on the fuel line aft the valve seat 74. The gas fuel flows through the heat exchanger 57, through the fuel line 56 into fuel manifold 55 and into the multiplicity of fuel lines 31 and injection nozzles 82. The gaseous fuel flows from nozzles 82 at very high velocity augmenting the velocity of surrounding air flowing into tube 17 from air inlet holes 25, 26, 28 and 29. High velocity fuel and air mixture flows into the larger tube 16 and into combustion chamber 11. With the ignition plug 81 providing a continuous spark, gas ignites providing a steady-state rumble and heating the heat exchanger instantly. The exhaust gas flows aft through the reduction cone 12, exhaust tube 13 and out exhaust tube nozzle 14. This operating condition is zero thrust idle without combustion pulsations. After allowing five to ten seconds warm-up period for the heat exchanger 57, the throttle lever 85 is turned to the full open position. The engine starts resonating at its natural frequency. The high pressure exhaust gas flows out the exhaust tube 13 and flows through air inlet tube 16 in the aft direction into the smaller inlet tube 17 and between the openings of the two tubes 16, 17 into the annular plenum chamber 19. The high pressure exhaust gas flows through blow holes 41 of the diaphragm back plate 47 and impinging on and closing diaphragm 40, thus stopping the exhaust flow at the valve body 50. The high pressure exhaust gas blowing through duct 17 impinges upon piston 24 of one way valve 21 and moving it aft and closing it. Because the valve has a relatively high mass and inertia it cannot sense and respond to the relatively high combustion frequency of the engine. It senses mean effective pressure during engine operation, closing the valve for the duration of engine operation. All air entering the engine for combustion must now flow through valve assembly holes 48 and through the forward end of the rectangular cross section duct 49. While air is completely shut off by valve 21 during normal engine operation, high velocity fuel still feeds through duct 17 augmenting air in the plenum chamber 19 and between air inlet tubes 16 and 17. The air fuel mixture, with the help of a partial vacuum that results during that portion of the combustion cycle, flows into combustion chamber 11 for the next combustion cycle.

Diaphragm 40 is very light weight and senses the peak pressures of the resonant combustion cycle in the engine, thus allowing a fresh charge of air during the intake portion of the cycle and blocking the gas at the exhaust portion of the cycle. The engine operates at maximum power without forward movement. When the engine powers a moving vehicle, such as an aircraft, air will flow through the forward end of ducts 49 at an increasing velocity. If air inlet valves are installed vertically, such as the V-1 drone pulse jet engine, impact pressure builds up to such a point that the valves will delay closing and will tend to operate out of resonance with the natural combustion frequency of the engine causing a loss of thrust and efficiency. The valve assemblies 18 on this engine invention lie flat relative to the high velocity air flowing around the engine. The high velocity air flowing through ducts 49 is restricted to some extent by spring-loaded door 52. By restricting some of the incoming air, it helps divert air through the valve holes 48 on demand. When incoming air reaches an excessively high impact pressure the spring-loaded doors open, dumping excess air aft into the airstream. The valve holes 48 sense essentially static pressure found near the walls of the duct.

The exhaust end of this invention is essentially the same as described in my U.S. Pat. No. 3,823,554. The exhaust gas flows through exhaust gas tube 13, into exhaust tube nozzle 14. During the last half of the combustion cycle, ambient air reverse flows into exhaust tube 13 and nozzle 14. The next combustion generates a shock wave, that like a piston, accelerates the residue air collected in the exhaust tube, out the exhaust end and contributing to the overall thrust of the engine. When the engine is traveling at high velocity it becomes more difficult for the ambient air to reverse flow into the exhaust tube nozzle 14. The previously described exhaust diffuser 60 slows the velocity of the air at the diffuser intake 63 permitting the air to reverse flow in a more efficient manner.

By emphasizing the structural features of this improved device, I do not intend to specifically limit my claims to the exact structure described. What is desired to be claimed is all devices incorporating equivalent structures not departing from the scope of the appended claims or their equivalents.

I claim:

1. A self starting valve type pulse jet engine comprising:
   a. a substantially cylindrical combustion chamber of circular cross section,
   b. an elongated substantially cylindrical exhaust tube of circular cross section projecting aft from said combustion chamber constructed and arranged on a common axis with the axis of said combustion chamber,
   c. a reduction cone intermediate said combustion chamber and said exhaust tube,
   d. a multiplicity of straight air and fuel inlets constructed in a single axis configuration, each air and fuel inlet utilizing two tubes including a forward tube and an aft tube axially aligned with each other, the forward tube of larger cross section and mounted in said reduction cone projecting into said combustion chamber, an opening between said axially aligned tubes,
   e. an annular plenum chamber surrounding the openings between the tubes, a number of shrouded valve assemblies equal to the number of openings and housed in the outer wall of said annular plenum chamber, the forward edge of said outer wall mounting the aft end of the combustion chamber outer wall, a plenum chamber aft cone shaped wall mounting the forward edge of said exhaust tube,
   f. said aft tube of each air and fuel inlet mounted to and penetrating through said plenum chamber aft cone shaped wall and projecting forward toward the aft end of said forward tube of each air and fuel inlet, g. a one way air valve mounted to the aft end of said aft tube of each air and fuel inlet guided to move fore and aft without rotation and permitting air flow into the combustion chamber only for engine starting, h. a fuel supply means operably associated with said combustion chamber and i. ignition means operably associated with said combustion chamber.

2. The invention of claim 1 wherein the construction and arrangement of the combustion chamber, exhaust tube, and air and fuel inlet combination places the axis of each element substantially parallel with the axis of each other element.

3. The invention of claim 1 including:
a. an exhaust tube nozzle secured to the aft end of said exhaust tube and
b. an exhaust tube diffuser secured to and encircling said exhaust tube nozzle, said exhaust tube diffuser constructed and arranged to reduce the rate of flow of ambient air adjacent said exhaust tube nozzle.

4. The invention of claim 3 wherein said exhaust tube diffuser comprises:
a. a diffuser inlet of substantially greater diameter than the diameter of said exhaust tube,
b. a diffuser flow channel projecting aft at a progressively reduced diameter, and said exhaust tube diffuser terminating in
c. a diffuser exhaust cone having a diameter less than the diameter of said diffuser inlet.

5. The invention of claim 1 wherein said combustion chamber includes a substantially flat forward wall normal to the axis of said exhaust tube.

6. The invention of claim 1 wherein said air and fuel inlets and said shrouded valve assemblies are substantially equiangularly positioned about said combustion chamber and said plenum chamber.

7. The invention of claim 1 wherein the aft end of the aft tube of each air and fuel inlet flares into a bellmouth.

8. The invention of claim 7:
a. wherein each one way air valve is mounted in prolongation of said bellmouth at aft end of the aft tube of each air and fuel inlets,
b. each one way air valve being spring loads to full open and full forward position,
c. each one way air valve containing a housing consisting of a cylindrical outer wall, an aft vertical wall with a reinforced hub located integrally with said vertical wall and on a centerline of said one way valve, a housing being secured to said aft tube of each air and fuel inlet by annular vertical plates,
d. each one way air valve containing a valve piston consisting of a cylindrical outer wall, an aft vertical wall with reinforced hub located integrally with said piston vertical wall and on a centerline of said one way valve, said hub of said piston containing a hole and suitable bearing surface,
e. each one way air valve piston guided to move fore and aft relative to engine axis, without rotation,
f. each one way air valve containing multiple air inlet openings in said valve housing and its vertical wall in proper alignment with holes in the outer wall and the vertical wall of the corresponding valve piston permitting unobstructed air flow into the related aft tube when the valve is in full open position,
g. each one way air valve piston outer wall sliding fore and aft inside the outer wall of the corresponding oneway air valve housing, and the related piston hub secured around and sliding fore and aft on a fuel line segment acting as a shaft, which penetrates through and secures into the hub of the valve housing aft vertical wall,
h. each one way air valve having a compression spring mounted around its related fuel line segment and supplying a constant pressure against the vertical wall of the corresponding piston tending to keep the piston in its full forward position.

9. The invention of claim 1 wherein,
a. a shroud is removably secured to top end of each valve assembly,
b. each shroud being essentially a duct of rectangular cross section with an aft end containing a spring loaded normally closed door,
c. each shroud containing a spiral torsional spring coiled around a hinged shaft that rotatably secures said air restricting door to said rectangular cross sectioned shroud.

10. The invention in claim 1 wherein:
a. each valve assembly contains a circular valve plate, a circular heat resistant fiber diaphragm, a rigid diaphragm back plate, with suitable fasteners, spacers, and guide pins to enable said valve assembly to function in resonance with the natural frequency of said engine,
b. each circular valve plate includes double beveled edges, the inner bevel relative to the center line of said engine matching a flange of a short length thin walled cylindrical member which secures to said outer cylindrical wall of said plenum chamber, a screw adjusted circular clamp removably securing said valve assembly to said flange of said cylindrical member.

11. The invention of claim 1 where said fuel supply means includes:
a. fuel tank and relief valve capable of retaining a liquified gaseous fuel,
b. a liquid fuel line communicating with bottom of said fuel tank, and
c. a throttleable fuel needle valve with an extended valve stem for frost and ice protection and a special thread in the valve bonnet, said valve stem permitting maximum power to be obtained with a 90 degree turn of the valve lever, an O-ring located on the said valve stem preventing fuel leakage between said threads of said valve bonnet and said valve stem,
d. a fuel heat exchanger in said fuel line intermediate said throttleable fuel needle valve and fuel line leading to a fuel manifold, said fuel heat exchanger being positioned in the forward end of said combustion chamber in the form of a spiral bounded by the said combustion chamber wall,
e. said fuel manifold located aft of the one way air valves of the aft tubes of the air and fuel inlets and circling around said exhaust tube,
f. a fuel line intermediate said fuel manifold and said fuel line segment secured to the hub of each valve housing,
g. the exhaust end of each fuel line segment containing a high speed fuel nozzle.

* * * * *